United States Patent [19]

Tone et al.

[11] Patent Number: 5,042,604
[45] Date of Patent: Aug. 27, 1991

[54] WORKING VEHICLE

[75] Inventors: Masatsugu Tone; Mikio Yuki; Ryozo Imanishi; Yoji Fujiwara; Akira Minoura, all of Osaka, Japan

[73] Assignee: Kubota, Ltd., Osaka, Japan

[21] Appl. No.: 405,349

[22] Filed: Sep. 11, 1989

[30] Foreign Application Priority Data

Mar. 23, 1989 [JP] Japan .................................. 1-73072

[51] Int. Cl.⁵ ............................................. B60K 11/04
[52] U.S. Cl. ................................................. 180/68.4
[58] Field of Search .................. 180/68.1, 68.4, 68.5, 180/69.2, 69.22, 69.23, 300, 291; 248/634, 635; 165/67

[56] References Cited

U.S. PATENT DOCUMENTS 3,066,606 11/1963 Schwiering et al. .............. 180/68.4
4,029,969 6/1977 Kondo et al. .................... 180/69.22
4,821,828 3/1989 Schwerzler ....................... 180/68.4

Primary Examiner—Andres Kashnikow
Assistant Examiner—Richard Camby
Attorney, Agent, or Firm—Webb, Burden, Ziesenheim & Webb

[57] ABSTRACT

A working vehicle comprising an engine mounted on a vehicle frame, a control box mounted on the vehicle frame, and a radiator erected on the vehicle frame between the engine and the control box structure. A dust-proof space is defined by the control box, the radiator and a hinged hood covering the engine. Elastic sealing elements are arranged between opposite lateral sides of the control box and the radiator, and between an upper end of the radiator and the hood. The hood in a closed position presses upon the upper elastic elements to provide an additional support for the radiator and to seal the dust-proof space.

6 Claims, 4 Drawing Sheets

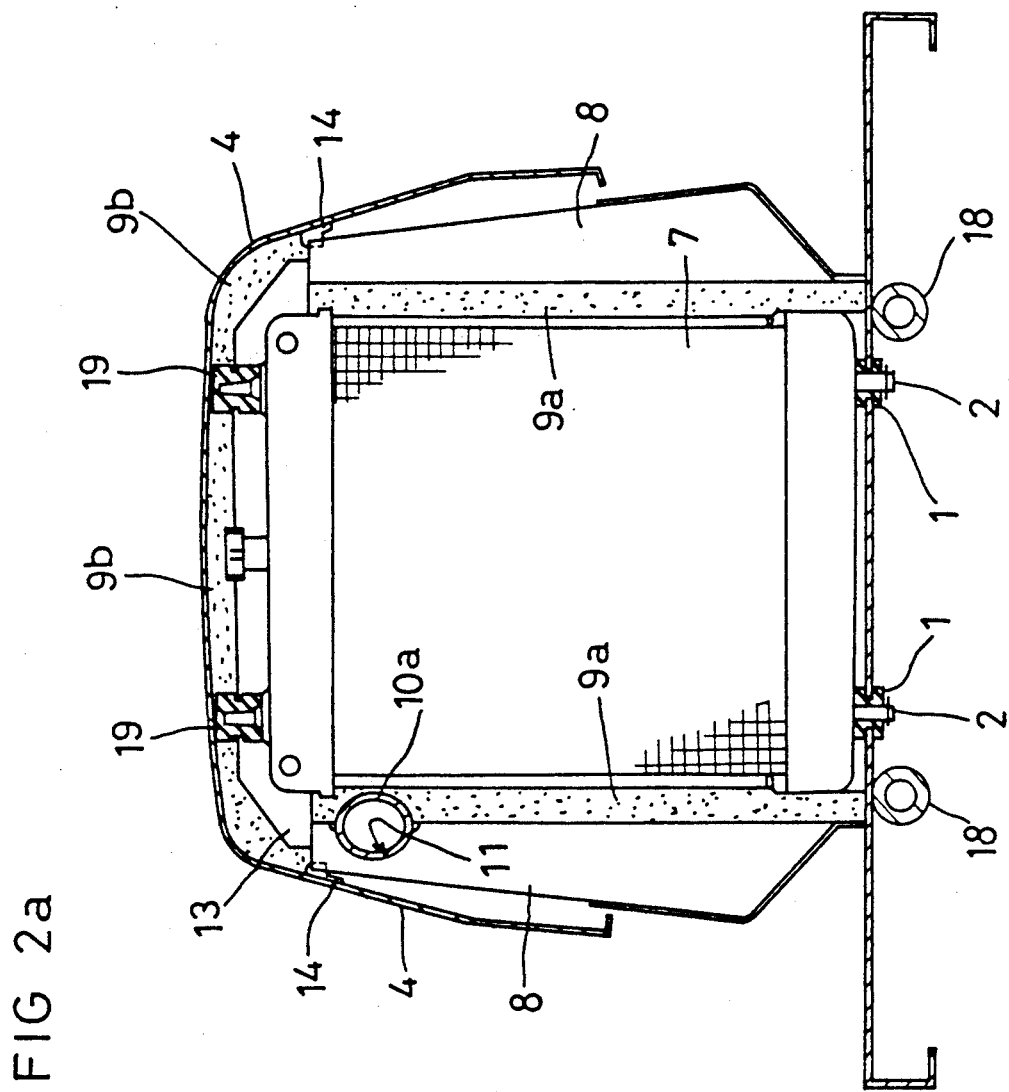

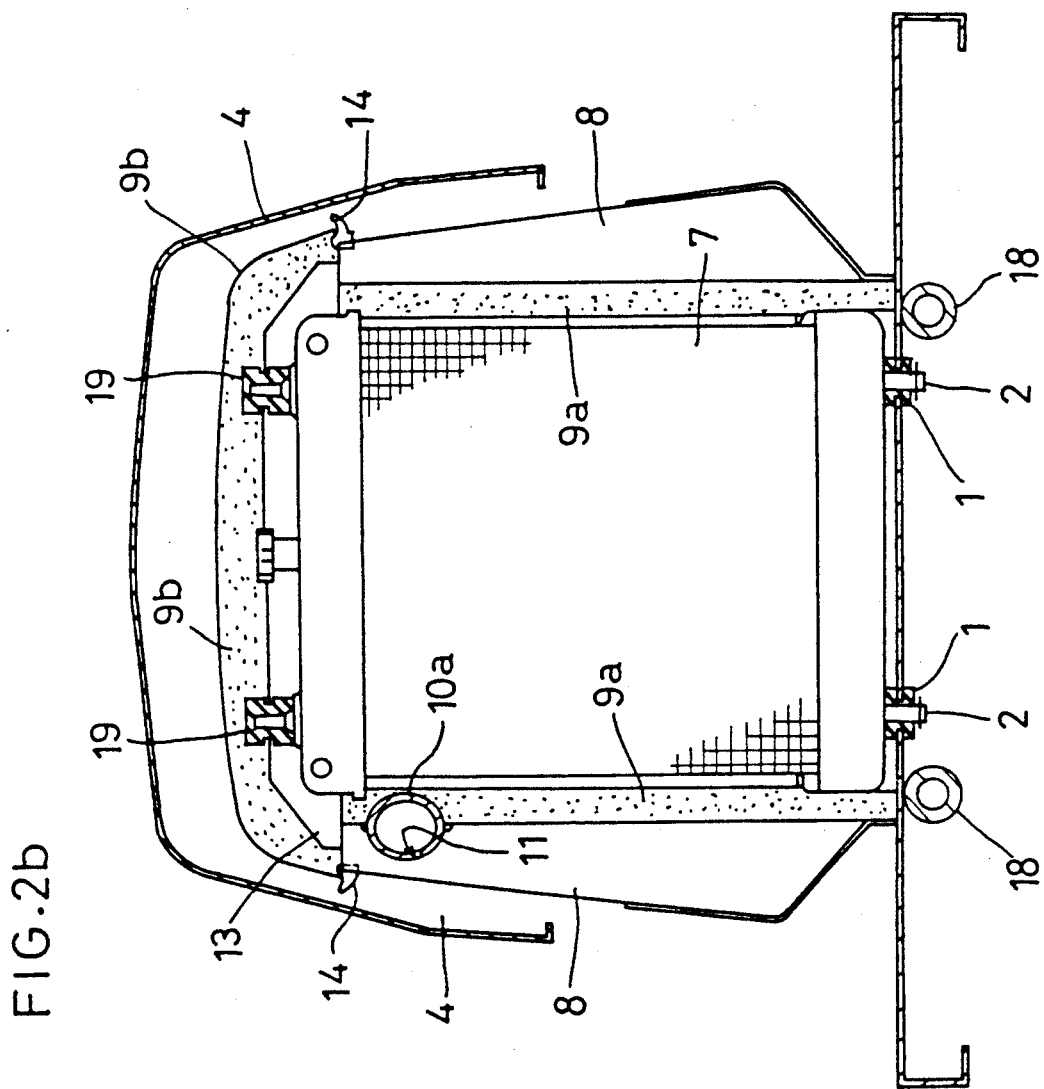

WORKING VEHICLE

BACKGROUND OF THE INVENTION

1. Field of the Invention

The present invention relates to a radiator mounted in an engine room of a working vehicle, and more particularly to a radiator mounting structure.

2. Description of the Prior Art

In conventional working vehicles, generally, the radiator is supported at upper and lower positions thereof by a vehicle frame or a structure continuous with the vehicle frame through rubber cushions. If the thin radiator were just erected, the radiator could swing in the direction perpendicular to its suction face to contact an adjacent object, and could be damaged through contact with a fan supported by the engine. The top support of the radiator is essential for preventing such swinging movement. Conventionally, it has been necessary to erect a support frame specially for supporting the top of the radiator unless there is an adjacent element available for the purpose.

SUMMARY OF THE INVENTION

An object of the present invention is to provide a technique of allowing the radiator to be supported on a vehicle frame with a positive vibration-proofing effect without necessitating a special support frame.

In order to achieve the above object, a working vehicle according to the present invention comprises an engine mounted on a vehicle frame, an openable hood for covering the engine, an engine room defined around the engine by the vehicle frame and the hood, a radiator erected inside the engine room and on the vehicle frame through vibration-proofing elastic means, and upper vibration-proofing elastic means arranged at an upper end of the radiator, wherein the hood in a closed position presses upon the upper vibration-proofing elastic means to provide an additional support for the radiator.

With the working vehicle according to the present invention as constructed above, the radiator may be mounted securely without necessitating a special radiator support frame.

The foregoing object may also be achieved by a different vehicle constructed within the scope of the present invention. This vehicle comprises an engine mounted on a vehicle frame, an openable hood for covering the engine, a control box structure mounted on the vehicle frame, a radiator erected on the vehicle frame between the engine and the control box structure, a dust-proof space defined by the control box structure, the hood and the radiator, and elastic means for sealing the space, which includes lateral elastic means arranged between opposite lateral sides of the control box structure and the radiator, and upper elastic means arranged between an upper end of the radiator and the hood, wherein the hood in a closed position has an inside wall thereof pressing upon the upper elastic means to provide an additional support for the radiator.

This construction produces the additional effects that the hood in the closed position presses upon the top of the radiator, and that a dust-free space is formed at a suction side of the radiator. Consequently, the radiator is held tight between the hood and the vehicle frame. Further, where a grass cutting implement is attached to the tractor, for example, the dust-free space prevents grass clippings from adhering to a suction face of the radiator.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 2a is a front view in vertical section of a radiator and adjacent components with a hood in a closed position, FIG. 2b is a front view in vertical section of the radiator and adjacent components with the hood in a slightly opened position.

DESCRIPTION OF THE PREFERRED EMBODIMENT

The invention will be described hereinafter as applied to a tractor carrying a grass cutter which is one example of working vehicles.

Figure 1:
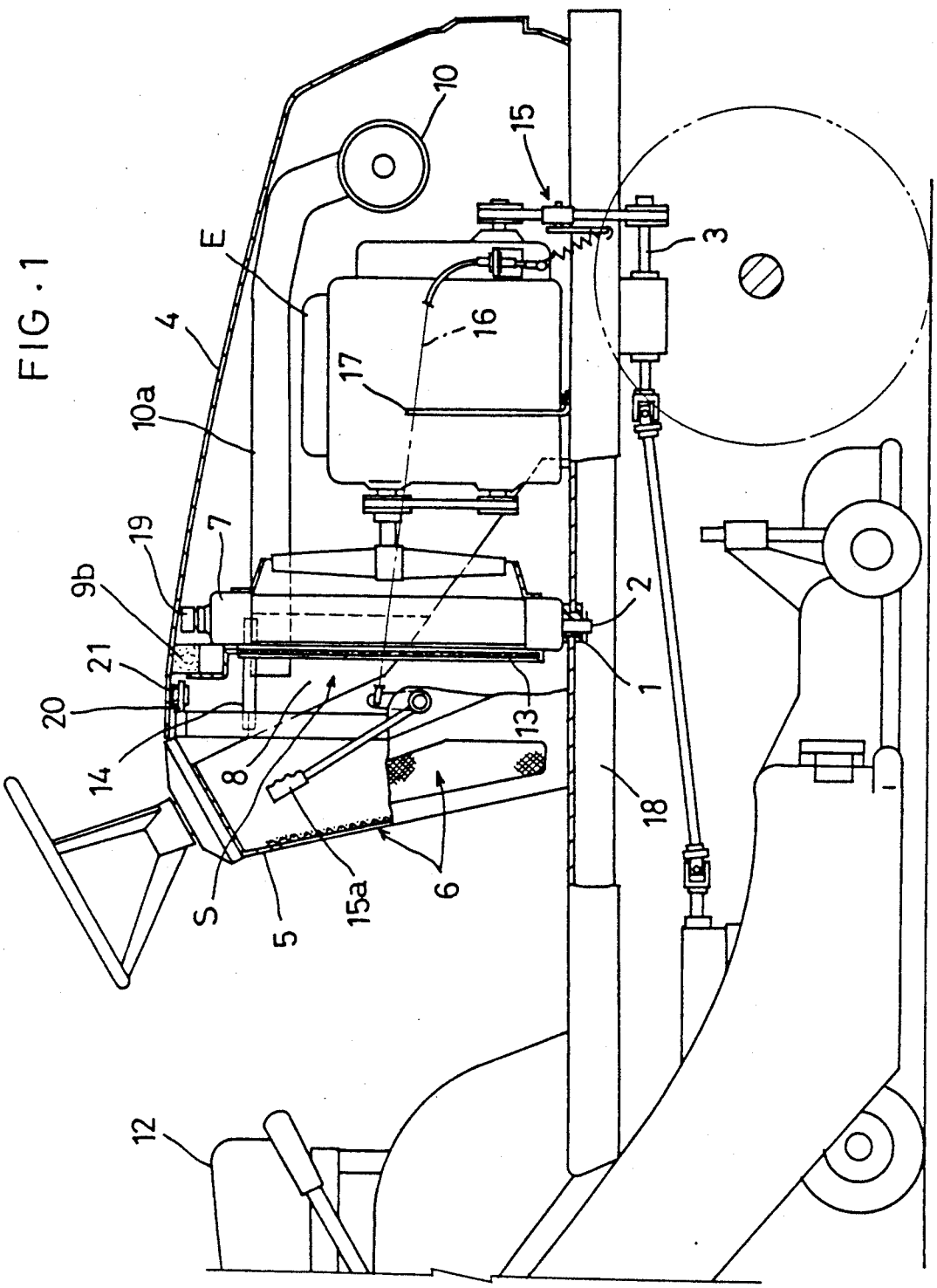
FIG. 1 is a side view, partly broken away, of a front portion of a tractor according to the present invention.

As shown in FIG. 1, the tractor comprises a hood 4 defining an engine room, the hood 4 being opened and closed through pivotal movement about a transverse axis at a forward end of the tractor. The engine room houses an engine E and a radiator 7 rearwardly of the engine E and adjacent a control box 5. The control box 5 acts also as a suction box for drawing cooling air which is directed from a driver's section forwardly toward the engine E.

As also shown in FIGS. 2a and 2b, the control box 5 defines suction openings 6 with dust screens opposed to a driver's seat 12. and a dust-proofing space S bounded at a forward end by the radiator 7 and at a top by an end area of the hood 4. The space between the control box 5 and radiator 7 is laterally sealed against entry of dust by shields 8 extending from the control box 5 to lateral faces of the radiator 7 and by sponge elements 9a disposed therebetween. The engine room further includes an air cleaner 10 disposed in a forward region thereof, from which an intake pipe 10a for drawing clean air extends into the control box 5 through, and is supported by, a cutout 11 defined in the shield 8 and sponge element 9a at one lateral side. A dust screen 13 is upwardly removably mounted adjacent a face of the radiator 7 opposed to the control box 5 for preventing clogging of the radiator 7. The dust screen 13 carries a sponge element 9b mounted on top for filling a gap between the hood 4 and an inside face of the control box 5. The control box 5 includes lip members 14 at laterally opposed openings edges for filling gaps between the control box 5 and the hood 4. These lip members 14 also facilitate opening and closing of the hood 4.

Figure 3:
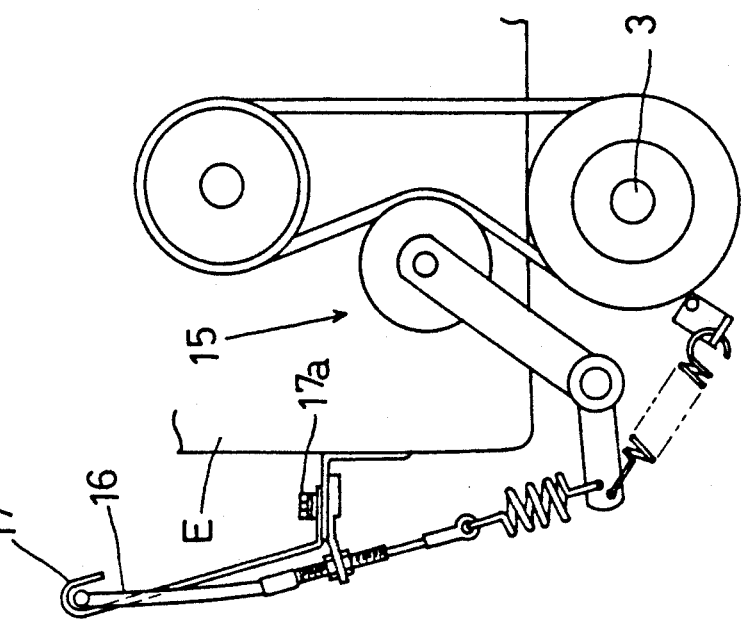
FIG. 3 is a front view of a tension clutch.

The tractor further comprises a power takeoff shaft 3 and a tension clutch 15 at the forward end thereof for driving a working implement such as a grass cutter. The tension clutch 15 is interlocked through a release wire 16 to a clutch lever 15a extending from the control box 5, so that the clutch 15 is operable from the driver's section. As shown in FIG. 3, a retainer element 17 is formed by bending opposite ends of a piano wire into a U-shape, one of the U-shaped ends being secured to the engine E by an attaching bolt 17a and the other U- shaped end receiving an intermediate position of the release wire 16. Thus, the release wire 16 is held steady during a clutch operation, and prevented from being caught when the hood 4 is opened or closed.

FIGS. 2a and 2b show a mounting structure for supporting the radiator 7 against vibration, with the hood 4 in a closed position and in a slightly opened position, respectively. The mounting structure includes two annular rubber cushions 1 for receiving right and left support legs 2 projecting the bottom of the radiator 7. In this way, the radiator 7 is erected with the rubber cushions 1 absorbing vibrations of the vehicle body. The radiator 7 further includes right and left rubber projections 19 secured to the top thereof. These projections 19 are pressed by an inside wall of the hood 4 in the closed position, thereby preventing the erected radiator 7 from swinging sideways.

Figure 4:
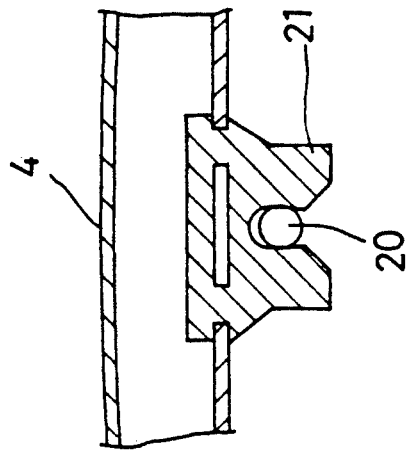
FIG. 4 is a front view in vertical section of a hood lock.

FIG. 4 shows a hood lock including a lock pin 20 projecting from the control box 5 and a locking rubber element 21 attached to the inside wall of the hood 4. The lock pin 20 is held as nipped in the depth of a narrow slit defined in the rubber element 21, thereby maintaining the hood 4 in the closed position.

What is claimed is:

1. A working vehicle comprising:
an engine mounted on a vehicle frame,
an openable hood for covering the engine,
an engine room defined around the engine by said vehicle frame and said hood,
a radiator erected inside the engine room and mounted directly on said vehicle frame by a first means for absorbing vibration, said first means for absorbing vibration comprising a cushion member,
second means for absorbing vibration arranged at an upper end of said radiator, and
an additional upper support for said radiator comprising said hood in a closed position pressed upon said second means for absorbing vibration, said second means for absorbing vibration comprising a cushion member mounted directly to one of said radiator and said hood.

2. A working vehicle comprising:
an engine mounted on a vehicle frame,
an openable hood for covering the engine,
an engine room defined around the engine by said vehicle frame and said hood,
a radiator erected inside the engine room and on said vehicle frame through first means for absorbing vibration,
second means for absorbing vibration arranged at an upper end of said radiator,
a control box structure rearwardly of said radiator with respect to the front of said vehicle, said control box structure defining suction openings having dust screens for directing air flows to said radiator and
an additional upper support for said radiator comprising said hood in a closed position pressed upon said second means for absorbing vibration.

3. A working vehicle as claimed in claim 2, further including shields extending from said control box structure to opposite lateral sides of said radiator, and elastic sealing elements disposed between said shields and said radiator.

4. A working vehicle as claimed in claim 3, wherein said engine room houses an air cleaner having an intake pipe extending and opening through a cutout defined in a region between one of said shields and one of said elastic sealing elements.

5. A working vehicle comprising;
an engine mounted on a vehicle frame,
an openable hood for covering the engine,
a control box structure mounted on said vehicle frame,
a radiator erected on said vehicle frame between said engine and said control box structure,
a dust-proof space defined by said control box structure, said hood and said radiator, and
elastic means for sealing said space, which includes lateral elastic means arranged between opposite lateral sides of said control box structure and said radiator, and upper elastic means arranged between an upper end of said radiator and said hood,
wherein said hood in a closed position has an inside wall thereof pressing upon said upper elastic means to provide an additional support for said radiator and to seal said dust-proof space.

6. A working vehicle as claimed in claim 5, wherein said control box structure defines suction openings having dust screens on a rear wall and/or lateral walls thereof with respect to a vehicle running direction for directing air flows to said radiator.

* * * * *